United States Patent [19]

Hambrecht et al.

[11] Patent Number: 4,496,679
[45] Date of Patent: Jan. 29, 1985

[54] STABILIZATION OF POLYPHENYLENE ETHER SOLUTIONS

[75] Inventors: Juergen Hambrecht, Heidelberg; Rudi W. Reffert, Beindersheim; Adolf Echte; Johann Swoboda, both of Ludwigshafen, all of Fed. Rep. of Germany

[73] Assignee: BASF Aktiengesellschaft, Fed. Rep. of Germany

[21] Appl. No.: 531,656

[22] Filed: Sep. 13, 1983

[30] Foreign Application Priority Data

Sep. 14, 1982 [DE] Fed. Rep. of Germany ....... 3234034

[51] Int. Cl.³ .............................................. C08L 71/04
[52] U.S. Cl. .................................... 524/111; 524/104; 524/110; 524/186; 524/205; 524/282; 524/291; 524/323; 524/345; 524/354; 524/356; 524/380; 524/611; 528/212; 528/214; 528/215; 528/216; 528/217
[58] Field of Search ............... 524/611, 111, 104, 110, 524/186, 205, 282, 291, 323, 345, 354, 356, 380; 528/212, 214–217

[56] References Cited

U.S. PATENT DOCUMENTS

| | | | |
|---|---|---|---|
| 3,639,334 | 2/1972 | Holoch | 524/611 |
| 3,700,750 | 10/1972 | Yamanouchi et al. | 524/611 |
| 4,016,138 | 4/1977 | Anderson | 524/611 |
| 4,024,093 | 5/1977 | Abolins et al. | 524/611 |
| 4,077,934 | 3/1978 | Lee, Jr. | 524/611 |
| 4,110,311 | 8/1978 | Cooper et al. | 528/211 |
| 4,116,939 | 9/1978 | Cooper et al. | 528/215 |
| 4,228,064 | 10/1980 | Izawa et al. | 524/611 |
| 4,309,335 | 1/1982 | Akutsu et al. | 524/611 |
| 4,380,597 | 4/1983 | Erwied et al. | 524/109 |
| 4,384,063 | 5/1983 | Luxon | 524/611 |
| 4,385,146 | 5/1983 | Axelrod | 528/212 |

FOREIGN PATENT DOCUMENTS

| | | |
|---|---|---|
| 0051743 | 5/1982 | European Pat. Off. . |
| 0081708 | 6/1983 | European Pat. Off. . |
| 2909108 | 11/1980 | Fed. Rep. of Germany . |

Primary Examiner—Lester L. Lee
Attorney, Agent, or Firm—Keil & Weinkauf

[57] ABSTRACT

A process for the preparation of high molecular weight polyphenylene ethers from alkyl-substituted monohydric phenols by an oxidative coupling reaction with oxygen in the presence of a catalyst complex of a copper salt and an organic amine, subsequent stopping of the reaction and removal of the metal component of the catalyst by addition of chelating and/or salt-forming agents, wherein the polymer solution is treated with a compound having the general structure:

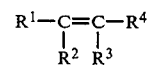

where $R^2$ and $R^3$ can be identical or different and each is OH, $NH_2$, $NHR^5$, where $R^5$ is alkyl or cycloalkyl, or SH, and where $R^1$ and $R^4$ are identical or different, being hydrogen, alkyl, cycloalkyl, aryl, carbonyl, carboxyl, carboxyalkyl or nitrile, and can be linked to form a ring, advantageously in an amount of from 0.1 to 100 mmoles and advantageously in from 1 to 20% strength aqueous solutions.

5 Claims, No Drawings

STABILIZATION OF POLYPHENYLENE ETHER SOLUTIONS

The present invention relates to a process for the preparation of high molecular weight polyphenylene ethers from monohydric phenols which carry alkyl substituents in the two ortho-positions and possibly in the meta-position but not in the para-position, by an oxidative coupling reaction with oxygen at from 15° to 50° C. in the presence of a catalyst complex of a copper salt and an organic amine in the presence of a solvent in a weight ratio of from 1:1 to 20:1, based on the monomeric phenol, and in the presence or absence of an activator, and subsequent stopping of the reaction and removal of the metal component of the catalyst by addition of chelating and/or salt-forming agents.

Polyphenylene ethers and processes for their preparation are generally known and have frequently been described, for example in U.S. Pat. Nos. 3,306,874, 3,306,875 3,639,656, 3,642,699 and 3,661,848, the disclosure content of which is included in the present application.

The processes most frequently used for the preparation of polyphenylene ethers include autocondensation of monohydric phenols by the action of oxygen in the presence of a catalyst, preferably a metal-amine complex, in particular a Cu-amine complex. Preferred solvents are aromatic hydrocarbons. The reaction is usually ended by removing the catalyst from the mixture by countercurrent extraction using an aqueous solution of an inorganic or organic acid, as, for example, in German Laid-Open Application DOS No. 2,105,372. Polyaminocarboxylic acids (cf. German Laid-Open Application DOS No. 2,364,319) or other chelating agents, such as nitrilotriacetic acid and sodium salts thereof or ethylenediamine tetraacetic acid and sodium salts thereof (cf. German Laid-Open Application DOS No. 2,532,477) are also used, the latter also in combination with quaternary ammonium salts (cf. U.S. Pat. No. 4,026,870). Removal of the catalyst with the aid of complexing agents from the bisguanide group is also described (cf. German Laid-Open Application DOS No. 2,460,325). Besides stopping the oxidative autocondensation, the object of addition of the complexing agent is also substantially complete removal of the catalyst from the polyphenylene ether, since residual metal impurities in the polymer lead to an impairment of the overall pattern of properties of the polymer. As a rule, an additional measure must be taken, in addition to removal of the catalyst system, in order to stabilize the polyphenylene ether solutions toward molecular weight degradation. German Laid-Open Application DOS No. 2,616,746 therefore proposes treatment of the polymer solutions with reducing agents, eg. sodium dithionite or hydrazine. However, in most cases this measure is not sufficient to achieve stabilization over prolonged periods. German Laid-Open Applications DOS No. 2,430,130 and DOS No. 2,754,887 therefore disclose the addition of dihydric phenols, besides the conventional reducing agents. Combinations of sodium dithionite or sodium sulfite and hydroquinone are described as examples in these publications. However, it has been found that even this measure is not sufficient to protect polyphenylene oxide solutions from molecular weight degradation over a prolonged period at as high as 200° C. in one operation. Moreover, disadvantages resulted in respect of the intrinsic color of the polyphenylene oxide solutions and especially during removal of the aqueous solutions of the reducing agents. These are generally removed from the organic solution of the polyphenylene ether together with the aqueous solutions of the catalyst-removing agents. Thus, if the above combination of reducing agent and dihydric phenol is used, problems arise in separation of the organic phase from the aqueous phase, one result being that removal of the catalyst is incomplete.

It is an object of the present invention to provide a simple, highly effective process for removing the catalyst residues during the autocondensation of monohydric phenols in the presence of oxygen while at the same time stabilizing the resulting polyphenylene ether solution toward molecular weight degradation. The stabilization should also be effected at as high as 200° C. over prolonged periods, ie. several days.

We have found that this object is achieved by a process wherein, after removal of the metal component of the catalyst, the polymer solution is treated with a compound of the general structure

where $R^2$ and $R^3$ can be identical or different and each is OH, $NH_2$, $NHR^5$, where $R^5$ is alkyl or cycloalkyl, or SH, and $R^1$ and $R^4$ are identical or different, being hydrogen, alkyl, cycloalkyl, aryl, carbonyl, carboxyl, carboxyalkyl or nitrile, and can be linked to form a ring.

Preferred compounds of the general structure (I) are tetronediols of the structure:

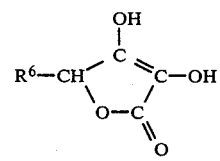

pyronediols of the structure:

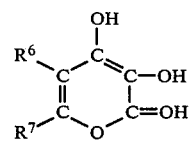

and the corresponding dihydropyronediols, where $R^6$ and $R^7$ can be identical or different and each is hydrogen, alkyl, cycloalkyl, aryl, carbonyl, carboxyl, carboxyalkyl or nitrile, and pyridonediols, dialuric acid and derivatives thereof, pyrogallol and dihydropyrogallol and derivatives thereof, and linear diketocarbinols, diketoendiols and endiolcarboxylic acids.

A process in which the polymer solution is treated with ascorbic acid and/or a derivative thereof, hydroxymalonaldehyde, diacetyl- or dibenzoyl-carbinol, dihydroxydibenzoylethylene, rhodizonic acid, croconic acid, hydroxypyruvic acid, dihydroxymuconic acid, dialuric acid or pyrogallol, is particularly preferred.

From 0.1 to 100 mmoles of the compound of the general structure (I) per mole of monomeric phenol is advantageously used, in the form of a from 1 to 20% strength by weight aqueous solution.

For the purposes of the invention, high molecular weight polyphenylene ethers are the alkyl-substituted benzene rings bonded in ether-like form by oxygen atoms in the para-position by oxidative coupling of 2,6-dialkylphenol to form a chain. The polymers according to the invention have molecular weights of from 10,000 to 90,000, preferably from 20,000 to 80,000, determined by the method described in "Macromolekular Synthesis" 1 (1978), 83. High molecular weight polyphenylene ethers, also called poly(phenylene oxides) have been known per se from the literature for a relatively long time (cf., eg., U.S. Pat. Nos. 3,661,848, 3,219,625 and 3,378,505), so that no further description is necessary here.

The monohydric phenols which carry alkyl substituents in the two ortho-positions and possibly in the meta-position but not in the para-position and which can be used for the preparation of the high molecular weight polyphenylene ethers are the conventional phenols, eg. 2,6-dimethylphenol, 2,6-diethylphenol, 2-methyl-6-ethylphenol, 2-methyl-6-propylphenol, 2,6-dibutylphenol, 2,3,6-trimethylphenol and mixtures of these phenols.

The polycondensation is usually carried out by passing oxygen into the monomer solution, which has been heated at from 15° to 50° C., in the presence of a catalyst complex. The oxygen flow rate is substantially the same as that described in U.S. Pat. Nos. 3,306,874 and 3,306,875.

In a preferred process, the catalyst of copper salt, preferably copper-I bromide, and amine, and from 0.01 to 5% by weight of 2,6-dimethylphenol are metered into the monomer solution.

The catalyst complex known for the polycondensation is usually a combination of an amine, eg. n-dibutylamine, diethylamine, picoline, quinoline, a pyridine base, triisopropylamine, dimethylisopropanolamine, triethanolamine, triisopropanolamine or diisopropanolamine, and a copper salt, such as copper-I bromide, copper-I chloride, copper-I iodide, copper-II acetate, copper-II chloride, copper-II propionate, copper-II acetoacetate or copper-II acetylacetonate. The amount of amine employed is preferably from 2.0 to 25.0 moles per 100 moles of the monomer, but the concentration in the reaction mixture can vary within wide limits, although low concentrations are advantageous. The concentration of the copper salt is kept low and preferably varies from 0.2 to 2.5 moles per 100 moles of the monomer.

The ratio of solvent to monomer is usually in the range from 1:1 to 20:1 by weight, i.e. not more than a 20-fold excess of solvent is used.

Benzene, toluene or an aliphatic hydrocarbon, preferably a $C_6$–$C_{10}$-hydrocarbon, is used as the solvent.

The reaction mixture can also contain an activator, such as a diaryl guanidine or a diarylformamidine (cf. U.S. Pat. No. 3,544,515).

In a preferred process, the polycondensation reaction is carried out at from 15° to 50° C., preferably from 18° to 22° C. For this, the oxygen is introduced into the monomer solution, which has been warmed to from 15° to 50° C., in the presence of the amine complex. The reaction has ended in a short time, ie. the catalyst mixture is metered into the monomer solution in the course of from 0.1 to 1.5 hours, while gassing with oxygen or air.

When the polycondensation has reached the desired yield and the polymer has reached the desired molecular weight, the reaction solution contains from 1 to 30% by weight of polyphenylene ether, from 0.005 to 1.5% by weight of metal ions and from about 0.1 to 6.0% by weight of amine, as well as small amounts of other materials in some cases. This reaction solution is treated with a complexing and/or salt-forming agent in order to remove the metal catalyst contained in the polymer. The manner in which the metal-bonding extraction agent is added is not critical. This extraction agent can therefore be added in bulk, in aqueous solution or in the form of its alkali metal or alkali earth metal salt. It can be added all at once or in several portions, continuously or batchwise, with or without additional water. The metal component can thereby be separated off in a suitable process apparatus, eg. in a decanting tank, a centrifuge or the like.

The contact time between the complexing and/or salt-forming agent and the catalyst-containing polyphenylene ether phase can vary within wide limits, but is preferably from 1 minute to 5 hours. A reaction time of from 5 to 60 minutes is frequently sufficient. The preferred reaction temperature is from 25° to 90° C., but lower or higher temperatures can also be applied.

Compounds selected from the group comprising polyalkylenepolyamines, polycarboxylic acids, polymeric polycarboxylic acids, aminopolycarboxylic acids, aminocarboxylic acids and aminophosphonic acids are preferably used as the complexing and/or salt-forming agent. Aminopolycarboxylic acids and their alkali metal and/or alkaline earth metal salts, eg. ethylenediaminetetraacetic acid, nitrilotriacetic acid and their monosodium, disodium and trisodium salts, citric acid, glycine, diglycollic acid, polyacrylic acid, polyethylenemaleic acid, aminotri(methylenephosphenic acid), hydroxyethanediphosphonic acid, hydroxyethyliminodiacetic acid and the like are particularly preferred.

The amount of complexing and/or salt-forming agent added is chosen so that not less than 1 mole of carboxylic acid and/or phosphonic acid group is present per mole of metal ion to be removed. In general, from 1.2 to 100 equivalents of carboxylic acid or phosphonic acid groups are employed per equivalent of heavy metal ion.

The metal catalyst can be completely removed from the polyphenylene ether polymer by adding several portions of the extraction agent and then separating off the resulting metal complex and metal salt according to the processes already described. However, an embodiment of the invention in which all the catalyst is removed from the polymer in one step is preferred.

After the metal component of the catalyst complex has been removed with the above extraction agents, the organic polyphenylene ether solution is stabilized by the process according to the invention. This is effected by adding a sufficient amount of a compound of the general structure (I) described above

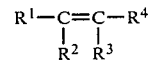

Compounds of the formula (I) which are derived from tetronediols of the structure:

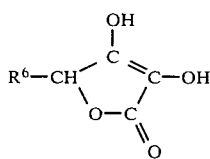

pyronediols of the structure:

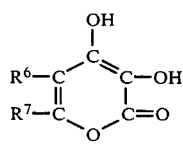

the corresponding dihydropyronediols, pyridonediols of the general structure:

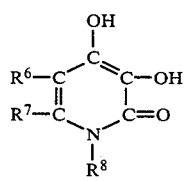

dialuric acid, pyrogallol or dihydropyrogallol and linear compounds built up from diketocarbinol, diketoendiol, endiolcarbonyl and endiolcarboxylic acid structure elements, are preferably employed.

Ascorbic acid and derivatives thereof, hydroxymalonaldehyde, diacetyl- and dibenzoyl-carbinol, dihydroxydibenzoylethylene, rhodizonic acid, croconic acid, hydroxypyruvic acid, dihydroxy-4-pyrone, pyronediolcarboxylic acid, coumarindiol, thiacoumarindiol and trihydroxyquinoline have proved to be particularly suitable. Ascorbic acid, dibenzoylcarbonol, hydroxypyruvic acid, dihydroxymuconic acid, pyrogallol and dialuric acid are especially used. The preparation and properties of these compounds are described in detail in the textbook by H. V. Euler and B. Eistert, Reduktone und Reduktonate, Enke-Verlag, Stuttgart, (1957).

The stabilizer is used in an amount such that the organic polyphenylene oxide solution remains stable for several days even at as high as 200° C., ie. it suffers no molecular weight degradation or other structural changes. As a rule, from 0.1 to 100 mmoles per mole of phenol employed in the oxidative coupling are required for this, and from 1 to 10 mmoles per mole of monomeric phenol are particularly preferably used.

The addition of the stabilizer is not critical as long as it takes place with or after the additive of the complexing and/or salt-forming agent for removing the metal component of the catalyst complex. The stabilizer can be added directly with or after the addition of the complexing and/or salt-forming extraction agent, so that no separate process step is required for subsequent removal of the aqueous phase. However, it can also be added in a separate process step. As a rule, the stabilizer is added to the organic polyphenylene ether solution in the form of a 1% strength by weight to saturated aqueous solution. However, pure stabilizer can also be added, especially if the stabilizing step is carried out directly after the extraction step for the metal component of the catalyst complex.

The contact time between the stabilizer and the substantially catalyst-free organic polyphenylene ether solution can vary within wide limits, but is preferably from 1 minute to 2 hours. However, reaction times of from 3 to 60 minutes are frequently sufficient. The reaction is as a rule carried out at from 20° to 120° C., but particularly preferably at from 50° to 80° C. Nevertheless, temperatures below and above this range can also be applied.

After the metal component has been removed as a complex and/or salt and the polyphenylene ether solution has been stabilized, the polyphenylene ether can be isolated from the solution by the processes described in the above U.S. Patents. The isolation of the polyphenylene ether is not critical for the present invention. Thus, for example, the polyphenylene ether can be isolated by precipitation from a reaction solution by means of an antisolvent, eg. an excess of an alcohol, ie. methanol. The filtered product can be suspended in alcohol and—if desired—stirred with a decolorizing agent, and the polyphenylene ether is then filtered off and converted to films, fibers, shaped articles and the like by conventional processes. Other alcohols, eg. isopropanol, propanol or ethanol, can be used similarly.

As already mentioned, a preferred aspect of the present process is the preparation of heat-stable polyphenylene ether solutions having a low metal content, from which the polymeric substances can be isolated by so-called total isolation methods, eg. by spray-drying, vapor precipitation and hot water pulverization. This facilitates economic application of such processes, which are more economical than the known precipitation processes in respect of the energy required, the solvent losses and the like. However, a fundamental condition of this working-up process, which is inexpensive because it is energy-saving, is that the organic polyphenylene ether solutions must be stable at as high as 200° C., even over prolonged periods.

One of the particular advantages achieved with the invention is that it is possible to produce polyphenylene ether solutions which are heat-stable at as high as 200° C. with the aid of stabilizers according to the invention. A further advantage compared with the prior art, especially compared with German Laid-Open Application DOS No. 2,330,130 and DOS No. 2,754,887, is that the stabilizers according to the invention are completely effective by themselves, while combinations of reducing agents and dihydric phenols hitherto had to be used, without it being possible to achieve heat-stability as high as 200° C. Moreover, the stabilizers according to the invention lead to very light-colored polyphenylene ether solutions and molding materials. Finally, a further substantial technological advantage in using the stabilizers according to the invention in particular in comparison with the prior art of German Laid-Open Application DOS No. 2,754,887 is that, while problems arise in separating the organic phase containing polyphenylene ether from the aqueous phase containing the metal-extraction agent and stabilizer when a combination of reducing agent and dihydric phenol is used, these problems are substantially less severe with the stabilizers according to the invention since phase separation occurs within a few minutes, with a clear phase separation layer.

The following Examples illustrate the invention, without thereby limiting it. Unless indicated otherwise, parts are by weight.

The intrinsic viscosity is determined by measurement on 0.5% strength solutions in chloroform at 30° C.

EXAMPLE 1

Preparation of poly-(2,6-dimethyl-1,4-phenylene)ether

A mixture of 1.3 g of Cu—I bromide, 20 g of 1,4-dimethylpentylamine and 2 g of 2,6-dimethylphenol (=DMP was stirred at 20° C. for 5 minutes, while passing in oxygen, and a solution of 204 g of DMP in 1,400 ml of toluene was then metered in over a period of 30 minutes. The mixture was then stirred at 20° C. for a further hour. The reaction was carried out in the presence of 30 liters of oxygen per hour.

Purification of the reaction solution

When the reaction had ended, 20 ml of a 10% strength aqueous solution of a copolymer consisting of 72 parts of acrylic acid and 28 parts of maleic anhydride and having a K value of 30, measured in 1% strength solution in dimethylformamide according to DIN 53,726, were added to the polymer solution and the mixture was stirred vigorously at 60° C. for 10 minutes. After the organic and aqueous phases had completely settled, they were then separated.

Stabilization of the reaction solution

The solution of the polyphenylene ether in toluene was stirred vigorously with 15 ml of 10% strength aqueous ascorbic acid solution at 70° C. for 8 minutes. After the organic and aqueous phases had completely settled, they were then separated.

EXAMPLE 2

Preparation of poly-(2,6-dimethyl-1,4-phenylene)ether

A solution of 1.2 g of Cu—II chloride, 1.9 g of sodium bromide and 0.3 g of methyltrioctylammonium chloride in 15 ml of methanol was added to 1,100 ml of ethylbenzene and the mixture was stirred at 40° C. 14 g of di-n-butylamine and a solution of 275 g of 2,6-dimethylphenol in 400 ml of ethylbenzene were then added and the reaction solution was gassed with 0.1 m$^3$ of oxygen per hour for 90 minutes. The oxygen supply was then turned off and the reaction vessel was flushed with nitrogen.

Purification and stabilization of the reaction solution

When the reaction had ended, the polymer solution was stirred vigorously at 60° C. for 10' with 32 ml of a 5% strength aqueous solution of a polyacrylic acid of K value 20, measured in 1% strength solution in dimethylformamide 0.3 g of ascorbic acid was then added and the mixture was stirred vigorously at 75° C. for a further 10'. After the organic and aqueous phases had completely settled, they were then separated.

EXAMPLE 3

Poly-(2,6-dimethyl-1,4-phenylene)ether was prepared as described in Example 1. The polymer solution was likewise purified as in Example 1, except that 160 ml of a 2% strength aqueous solution of a polymaleic acid having a K value of 11, measured in 1% strength solution in dimethylformamide, were used. The solution was stabilized by addition of 30 ml of a 5% strength solution of dialuric acid in $H_2O$ at 75° C. for 5 minutes. The organic and aqueous phases were separated as described in Example 1.

EXAMPLE 4

Poly-(2,6-dimethyl-1,4-phenylene)ether was prepared and the catalyst was removed as described in Example 1. Stabilization was likewise carried out directly after extraction of the catalyst, by addition of 25 ml of a 10% strength ascorbic acid solution at 75° C. for 5 minutes, with vigorous stirring. The organic and aqueous phases were separated as described.

EXAMPLE 5

Poly-(2,6-dimethyl-1,4-phenylene)ether was prepared and the catalyst was removed as described in Example 2. The stabilization was carried out as in Example 4 using 400 ml of a 5% strength solution of dihydroxymuconic acid in water.

EXAMPLE 6

Poly-(2,6-dimethyl-1,4-phenylene)ether was prepared and the catalyst was removed as described in Example 2. The stabilization was carried out as in Example 4, using 80 ml of a 2% strength solution of pyrogallol in water.

EXAMPLE 7

The polyphenylene oxide was prepared as described in Example 1. For purification of the polymer solution, 8.0 g of ethylenediaminetetraacetic acid (cf. Example 1 of German Laid-Open Application DOS No. 2,364,319) were added and the polymer solution was stirred at 40° C. for 1 hour. Stabilization was carried out as described in Example 4.

COMPARATIVE EXAMPLE A

The polyphenylene ether was prepared as described in Example 1. For purification of the polymer solution, the procedure of Example 1 of German Laid-Open Application DOS No. 2,616,746 was followed, ie. a solution of 3.53 g of tetrasodium ethylenediaminetetraacetate and 2.73 g of sodium dithionite in 212 g of water was added and the mixture was stirred vigorously at 40° C. After the organic and aqueous phases had completely settled, they were separated.

COMPARATIVE EXAMPLE B

The polyphenylene ether was prepared as described in Example 1. To remove the catalyst and stabilize the polyphenylene ether solution, the procedure of Example 1 of German Laid-Open Application DOS No. 2,754,887 was followed. For this, the solution of the polyphenylene ether in toluene was stirred vigorously with 15.5 g of a 28% strength aqueous solution of trisodium ethylenediaminetetraacetate at 40° C. for 10 minutes, 0.66 g of hydroquinone and 2 g of sodium sulfite were then added and the mixture was stirred vigorously for 10 minutes. After the organic and aqueous phases had settled completely, they were separated.

TESTS

The time from addition of the stabilizer to complete separation of the organic and aqueous phases was first determined. This is recorded in Table 1, as is the limiting viscosity of the polyphenylene ether before and after heating of the toluene solutions of the polyphenylene ethers at 150° C. under a nitrogen atmosphere over a period of 48 hours. For this, the polyphenylene ether had to be precipitated from the organic phase by addition of methanol and then dried. A comparison of the examples in Table 1 shows the advantages of the process according to the invention.

TABLE 1

| Example | Time for complete phase separation (minutes) | Residual copper content (ppm) | Intrinsic viscosity (dL/g) | |
|---|---|---|---|---|
| | | | before heating | after heating at 150° C. for 48 h |
| 1 | 3 | 8 | 0.8 | 0.8 |
| 2 | 6 | 4 | 0.6 | 0.6 |
| 3 | 6 | 11 | 0.8 | 0.8 |
| 4 | 5 | 5 | 0.6 | 0.6 |
| 5 | 10 | 8 | 0.6 | 0.6 |
| 6 | 7 | 4 | 0.6 | 0.6 |
| 7 | 5 | 6 | 0.8 | 0.8 |
| Comparative example (not according to the invention) | | | | |
| A | 18 | 12 | 0.8 | 0.4 |
| B | 21 | 14 | 0.8 | 0.6 |

We claim:

1. A process for the stabilization of solutions of high molecular weight polyphenylene ethers, which solutions are formed by conducting an oxidative coupling reaction of oxygen and a monohydric phenol at a temperature of from 15° to 50° C. in the presence of a catalyst complex of a copper salt and an organic amine in the presence of a solvent in a weight ratio of from 1:1 to 20:1, based on the monomeric phenol, said monohydric phenol having alkyl substituents in the two ortho-positions and optionally in the meta-positions but not in the para-position, which stabilization process comprises: contacting the formed reaction solution containing the high molecular weight polyphenylene ethers with from 0.1 to 100 mmoles per mole of monomeric phenol of a compound of the structure $$R^1-C=C-R^4 \quad (I)$$
$$\phantom{R^1-}|\phantom{C=C}| $$
$$\phantom{R^1-C=C-}R^2\ R^3$$

where $R^2$ and $R^3$ can be identical or different and each is OH, $NH_2$, $NHR^5$, where $R^5$ is alkyl or cycloalkyl, or SH, and $R^1$ and $R^2$ are identical or different, being hydrogen, alkyl, cycloalkyl, aryl, carbonyl, carboxyl, carboxyalkyl or nitrile, and can be linked to form a ring.

2. The process of claim 1, wherein a from 1 to 20% strength by weight aqueous solution of the compound of the structure (I) is used.

3. The process of claim 1, wherein the polymer solution is contacted with the compound of the structure I at a temperature of from 25° to 90° C.

4. The process of claim 3, wherein the metal component of the catalyst is converted into a metal complex or salt when the polymer solution is contacted with a compound of the structure I.

5. The process of claim 1, wherein the compound of the formula I is ascorbic acid.

* * * * *